June 9, 1942.   E. E. CLINE   2,285,393
PIPE LINE STOPPER
Filed May 15, 1940
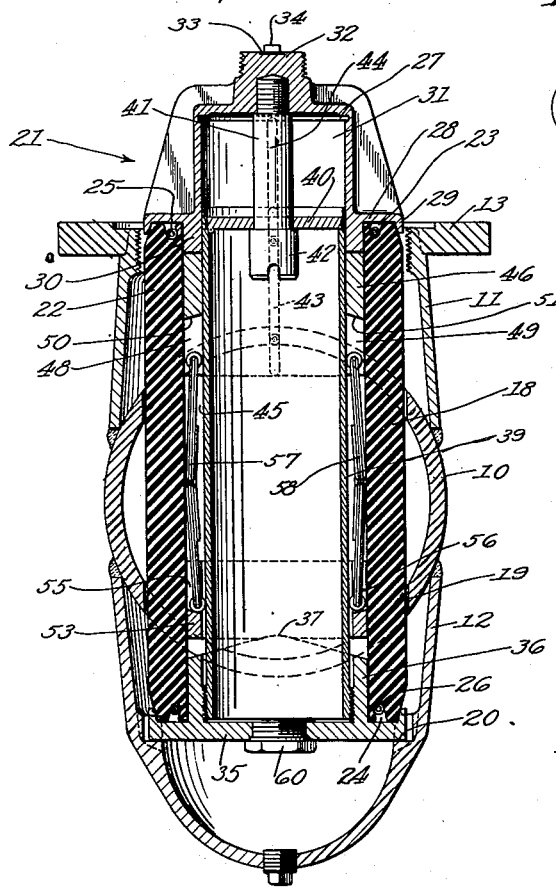
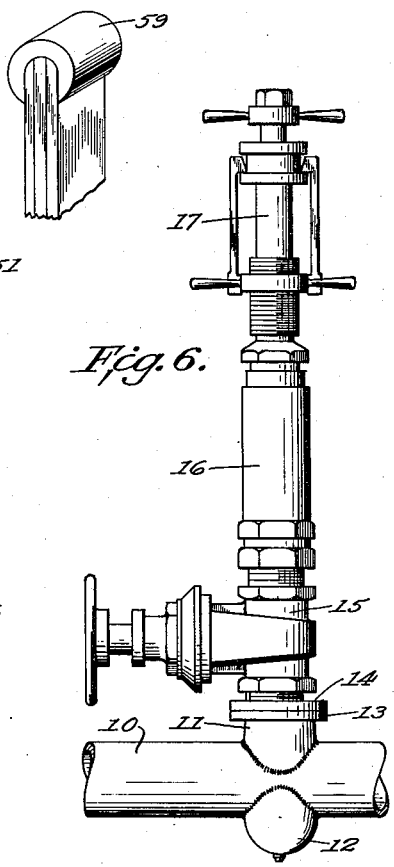
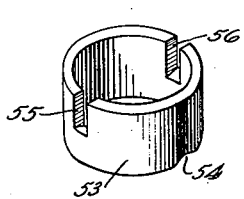
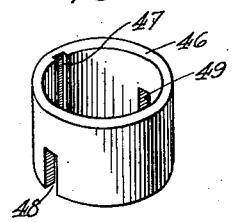
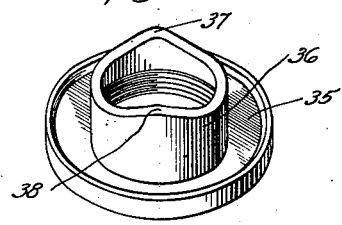
Inventor
Earl E. Cline.
By Cushman, Darby, Cushman
Attorneys Patented June 9, 1942

2,285,393

UNITED STATES PATENT OFFICE 2,285,393

PIPE LINE STOPPER

Earl E. Cline, Decatur, Ill., assignor to Mueller Co., Decatur, Ill., a corporation of Illinois Application May 15, 1940, Serial No. 335,408

15 Claims. (Cl. 138—94)

This invention relates to pipe line stoppers, and has as a purpose to provide an effective sealing unit which may be designed for use in mains of relatively large diameter. The stopper is particularly, although not necessarily exclusively, designed for use in a system such as shown, for example, in Patent No. 2,171,576, granted September 5, 1939, to T. A. Larry et al., wherein fittings are oppositely applied to the main, one being closed and the other being open and having applicable thereto a conventional drilling machine. After holes have been cut in the main within the fittings the stopper is insertable therethrough and expandible to form a seal. Another purpose of the invention is to provide a stopper which will fully adapt itself to sealing relation in the main even though the holes through which the stopper is introduced may be somewhat off the center of the main, and even though the inner surface of the main may not be truly circular. The various features whereby these and other useful results are attained will be apparent from the following description, in which reference will be made to the accompanying drawing.

In the drawing:

Figure 1 is an axial section of the new stopper, the above-mentioned fittings being also shown in axial section and a main in transverse section.

Figures 2, 3, 4 and 5 show details in perspective, and

Figure 6 is an elevation of a system utilizing the new stopper.

Referring to the drawing, reference numeral 10 designates a main which has secured thereto top and bottom fittings 11 and 12, the top fitting being internally threaded at its upper end for a pipe connection and having an outer annular flange 13 to which a flange 14, in connection with a gate valve housing 15, may be bolted. The housing 15 is surmounted by a barrel 16 through which, and the housing, is projectible a boring bar 17 in known manner to form top and bottom openings 18 and 19 in the main. The fitting 12 is downwardly closed and is provided with an internal annular shoulder 20 whose inner edge has a diameter less than the diameter of openings 18 and 19.

The stopper, generally designated by the reference numeral 21, comprises a cylindrical sleeve 22 which, while composed of the usual rubber or rubber composition, natural or artificial, is sufficiently thick-walled to be self-sustaining. Externally, the lateral ends of sleeve 22 are preferably somewhat beveled off as shown, and the ends themselves are provided with annular grooves 23 and 24 which are somewhat inwardly inclined and receive endless tension springs 25 and 26. A top cap 27 includes a radial flange 28 resting on top of sleeve 22, the flange being provided with a short outer lip 29 engaged around the beveled tip, and with an annular portion 30 which fits snugly within the sleeve end. Spring 25 serves to constrict the lip forming the inner boundary of groove 23 into tight engagement with portion 30. The cap includes a cylindrical cavity 31 in continuation of the inner surface of portion 30. Externally the cap has an axially threaded boss 32 provided at its top with a diametrical key-way 33, at one end of which is an upstanding lug 34.

A bottom cap 35 has an annular portion 36 extending snugly within the lower end of the sleeve and at diametrically opposite points is provided with crowns 37 and 38 as most clearly shown in Figure 4, these crowns being in the axial plane of key-way 33.

Threaded within the annular portion 36 is the lower end of a hollow cylindrical mandrel 39 whose upper portion is slidable in the annular portion 30 and in the cavity 31. Threaded in the upper end of the mandrel is a plug 40 having a central opening in which is slidable a retaining pin 41 which is threaded into the top wall of the cavity 31 and has a head 42 beneath the plug. The mandrel 39 and pin 41 thus serve to limit movement of the end caps apart while permitting their movement toward each other.

Mandrel 39 has fixed to its upper portion an external longitudinally extending spline 43 which is engaged in a groove 44 in a wall of cavity 31. While the cap and mandrel are thus relatively movable axially, they are held against relative rotation. In the annular space 45 between sleeve 22 and mandrel 39 is disposed a ring 46, this ring being disposed immediately inwardly of the annular cap portion 30 and being slidable on the mandrel. The ring 46 is held against rotation relative to the mandrel due to its provision with a groove 47 in which spline 43 is engaged. At diametrically opposite points the ring 46 is provided with recesses 48 and 49 extending axially upwardly from its lower edge, these recesses having parallel side walls and having end walls 50 and 51 which are inclined somewhat upwardly and inwardly. The diameter on which recesses 48 and 49 are disposed is at right angles to the key-way 33.

A ring 53 is disposed in the space 45 and has an inner diameter sufficiently greater than the outer diameter of mandrel 39, which it surrounds, so that the ring can rock relative to the mandrel. On its lower surface ring 53 is provided with a pair of shallow recesses as at 54, which receive the crowns 37 and 38 of annular cap portion 36. A pair of recesses 55 and 56 extend axially downwardly from the upper edge of ring 53 in alignment with the recesses 50 and 51 and shaped exactly as the latter.

A pair of flat springs 57 and 58, here shown as laminated, is disposed in the space 45 and have their ends disposed in the opposite recesses of rings 46 and 53, the lateral clearances being such that the spring ends are freely slidable in the recesses but are guided rectilinearly by the recess side walls. The ends of the springs are preferably equipped with curved shoes as at 59, and the springs are preferably initially somewhat outwardly bowed, so that these shoes bear against mandrel 39 and the middle portions of the springs against the sleeve.

With the stopper in the position shown in Figure 1, cap 35 rests on shoulder 20 and sleeve 22 is freely received in the openings 18 and 19. The main may be assumed to be of ten, twelve, or fourteen inch diameter, for example, and in such case the openings 18 and 19 may have a diameter of eight and one-fourth inches and the sleeve an outer diameter of eight inches, so that the stopper is freely insertable to the position of Figure 1. When downward pressure is applied to cap 27 by the bar 17 the sleeve 22 will be bulged outwardly to fill the openings 18 and 19. Eventually surfaces 50 and 51 come into engagement with the upper ends of springs 57 and 58 and the springs are bowed outwardly, distending and completely conforming opposite sides of the sleeve curvilinearly to the inner curvature of the main. The spring ends bear against the mandrel and surfaces 50 and 51 with minimized friction due to the provision of the curved shoes 59 and the said surfaces hold the spring ends against the mandrel. It will be remembered that recesses 50 and 51 are on a diameter at right angles to the key-way 33. Consequently, when the latter extends directly longitudinally of the main, the springs 57 and 58 are in a plane normal to the main axis and thus in a position to operate most effectively. The springs, due to the engagement of their ends in the recesses, and the positioning means constituted by the crowns and recesses, serve to maintain ring 53 in proper position.

If the openings 18 and 19 are off the center of the main or if the interior of the main is not truly circular, these factors are in any event accommodated by the slight rocking range of which ring 53 is capable, the rocking axis being in an axial plane of the main. The relatively thick rubber of the sleeve walls will act to the same effect and will flow into irregularities of the inner surface of the main. Tolerances are effectively accommodated.

Upon release of the pressure on the top cap 27 the sleeve will resume its cylindrical form and will return the end cap to its upper limit position. Ring 46 may not be returned to its upper position, but this is immaterial. The arrangement is such that with the ring in its upper position the ends of the springs are bound to be in the opposed recesses. As a matter of fact, ring 46 might be an integral part of the annular portion 30 and if it were desired to dispense with the rocking function of ring 53, the latter might be an integral part of annular portion 36. Furthermore, end surfaces 50 and 51 may be normally immediately adjacent the upper ends of the springs so as to take effect at once when the top cap is moved downwardly. In assembly, the pin 41 may, if desired, be applied through an opening in cap 35 normally closed by a plug 60.

Assuming that the main here shown as a ten inch diameter, the stopper can be adapted for twelve and fourteen inch mains merely by the provision of a longer sleeve 22, a longer mandrel 39, and longer springs 57 and 58. The other parts can be standard for the several sizes and the diameters of the sleeve and mandrel may remain the same in the various sizes, since in each case the openings as at 18 and 19 may be of the same diameter.

While I have described in detail a practical embodiment of the invention, it will be understood that the showing herein is merely illustrative and that I do not limit myself to details of form and arrangement except as in the following claims.

I claim:

1. A pipe line stopper comprising a rubber sleeve having end caps adapted to be moved one toward the other, a cylindrical mandrel extending longitudinally of the sleeve with outer surfaces spaced from the inner surfaces of the sleeve, annular portions surrounding the mandrel within the sleeve and moved together when the caps are moved together, and a pair of flat springs extending longitudinally between the sleeve and mandrel at opposite sides thereof, the ends of said springs being engageable by said annular portions when the latter move together whereby the springs are outwardly bowed to distend said sleeve curvilinearly.

2. Structure according to claim 1 wherein the mandrel constitutes a connecting element between the end caps limiting their movement apart.

3. Structure according to claim 1 wherein said annular portions have slots receiving and positioning the ends of the springs.

4. Structure according to claim 1 wherein one of said annular portions is rockable on an axis extending substantially midway between the springs and transversely of the sleeve and mandrel.

5. Structure according to claim 1 wherein said annular portions have slots receiving and positioning the ends of the springs, and wherein one of said annular portions is splined on said mandrel.

6. A pipe line stopper comprising a rubber sleeve, a cap for one end of said sleeve having a flange overlying an annular portion received in the sleeve end, the sleeve end being provided with an inwardly inclined annular groove, and spring constricting means disposed in said groove and acting to press the sleeve end circumferentially against said annular portion.

7. A pipe line stopper comprising a rubber sleeve having end caps, an annular portion within said sleeve immediately inwardly of one of said caps supporting the surrounding portion of the sleeve against collapse, a pair of flat springs in opposed relation within said sleeve and extending longitudinally of the latter, one end of said springs being adjacent said annular portion, and abutment means at the other end of said springs, the arrangement being such that movement of said one of said caps toward the other moves said annular portion whereby to bow said springs outwardly to distend said sleeve longitudinally, such movement serving also to bulge said surrounding portion of said sleeve circumferentially, said sleeve including a portion adapted to form a seal with a main opposite a side opening in the main through which the stopper is inserted, the bulging of said surrounding portion serving to seal the opening in the main, while the longitudinal distention of said sleeve forms a seal with the main throughout between said portions.

8. Structure according to claim 7, wherein said annular portion has slots receiving and positioning the ends of the springs.

9. A pipe line stopper comprising a rubber sleeve having end caps adapted to be moved one toward the other, annular portions inwardly of said caps sustaining the surrounding portions of the sleeve against inward collapse, and a pair of diametrically opposed flexible members within said sleeve and extending between said annular portions, the movement together of said end caps causing said sleeve to bulge circumferentially outwardly in the vicinity of said annular portions and causing said annular portions to exert a longitudinal compressive action on said flexible members whereby to bow the latter outwardly to distend said sleeve curvilinearly longitudinally thereof, such movement serving also to bulge said surrounding portion circumferentially whereby to seal opposed side openings in a main while the longitudinally curvilinearly distended portion of the main forms a seal throughout between said openings.

10. A pipe line stopper comprising a rubber sleeve, end caps for said sleeve movable one toward the other for bulging said sleeve circumferentially adjacent said caps, a mandrel extending longitudinally of said sleeve with outer surfaces spaced from the inner surfaces of said sleeve, a pair of flat springs disposed diametrically oppositely in longitudinally extending relation between the sleeve and mandrel with their ends bearing against the mandrel and intermediate portions bearing against said sleeve, and means engaging the ends of the springs to exert longitudinal compressive force thereon whereby to bow the springs outwardly and thereby distend the sleeve curvilinearly when said end caps are moved one toward the other.

11. Structure according to claim 10 wherein the last named means includes a ring loosely surrounding the mandrel and having a rocking bearing against an end cap on an axis extending transversely of the sleeve and mandrel midway between said springs.

12. Structure according to claim 10 wherein the last named means comprises rings on the mandrel provided with slots receiving and guiding the spring ends.

13. Structure according to claim 10 wherein the last named means comprises rings on the mandrel provided with slots receiving and guiding the spring ends, and wherein one of said rings is splined on the mandrel.

14. A pipe line stopper comprising a rubber sleeve insertable in diametrically extending relation through a side opening in a main, said opening having a diameter substantially less than the inner diameter of the main, and means within said sleeve operable to distend the sleeve curvilinearly laterally on opposite sides only, said sleeve including a portion circumferentially distensible to seal the opening in the main and including a portion adapted to form a seal with the main opposite said opening, the lateral distention of the sleeve causing it to form a seal with the main between said portions.

15. A pipe line stopper comprising a rubber sleeve insertable in diametrically extending relation through opposed side openings in a main, said openings having a diameter substantially less than the inner diameter of the main, means for axially compressing said sleeve to bulge it circumferentially in axially spaced zones to seal said openings and means within said sleeve operable to distend the sleeve curvilinearly laterally on opposite sides only to seal the main between said openings.

EARL E. CLINE.